Feb. 4, 1958 J. P. JONES 2,822,249
SEPARATION PROCESS AND APPARATUS
Filed Feb. 26, 1954
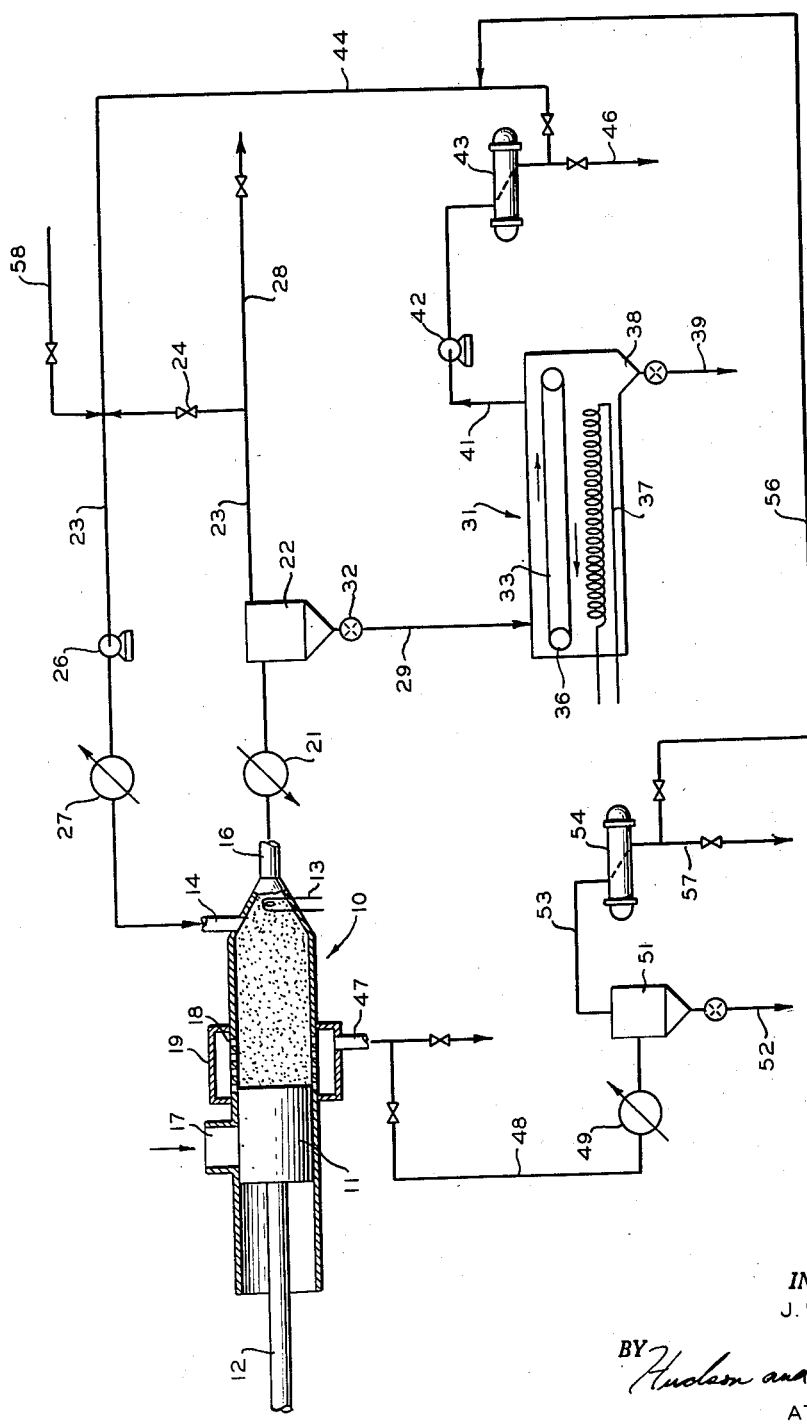
INVENTOR.
J. P. JONES
BY Hudson and Young
ATTORNEYS / 2,822,249
Patented Feb. 4, 1958

United States Patent Office

2,822,249

SEPARATION PROCESS AND APPARATUS

Jean Paul Jones, Bartlesville, Okla., assignor to Phillips Petroleum Company, a corporation of Delaware Application February 26, 1954, Serial No. 412,789

8 Claims. (Cl. 23—310)

This invention relates to a separation process and apparatus for use therewith. In a further aspect, this invention relates to a separation process in which solid or crystalline material is moved in a direction countercurrent to a liquid, this liquid removing impurities from the solid material. In a further aspect, this invention relates to the separation of materials which decompose on melting.

In Patent 2,617,274 of Schmidt, a process and apparatus for use therewith is disclosed by which material can be concentrated or purified utilizing crystallization. In this process a liquid solution is cooled sufficiently to form solid material therein, the solid material is introduced into a displacement zone, and a displacing liquid is forced therethrough. This displacing liquid can be the material being purified in liquid form.

By my invention, the apparatus of Schmidt can be utilized to purify materials which decompose on melting or which are not readily melted.

The following are objects of this invention.

An object of this invention is to provide a separation process. A further object of this invention is to provide apparatus suitable for use in separating materials. A further object of this invention is to provide a process of separating materials which decompose at the temperature required to melt them or which it is desired to recover in purified form without heating them to the temperature at which they melt.

Other objects and advantages of this invention will be apparent to one skilled in the art upon reading this specification. Accompanying and forming a part of this specification is a drawing, comprising one figure, which illustrates a preferred form of the apparatus of this invention, and in which the process of this invention can be practiced.

In this drawing, an elongated chamber 10 is provided with solid material moving means such as a piston 11. This piston is attached to piston arm 12 operated by suitable means (not shown) to drive it in a reciprocating manner. Other means, such as an auger, can be used. The other end of the elongated chamber may contain a heater 13, and is provided with a liquid inlet 14, and a liquid outlet 16. A feed material inlet 17 is provided in the chamber, this being open on the backward stroke of piston 12 and closed on the forward stroke thereof. Intermediate the ends of this chamber and preferably near the inlet 17, there is provided means for liquid removal. Preferably this liquid removal means comprises a suitable filter, such as a screen 18 extending at least part of the way around the outer surface of chamber 10 and a collecting chamber 19 surrounding this screen. Liquid removed through conduit 16 passes through cooler 21 to solid-liquid separation means 22, which can be a centrifuge, a gravity separator, or other apparatus for separating solid and liquid materials. Conduit 23 is a liquid return conduit extending to inlet 14, having valve 24, pump 26, and heater 27, positioned therein. Discharge conduit 28 extends from conduit 23. Also extending from liquid-solid separation means 22 is conduit 29, this extending to drier 31.

I have shown a star valve 32 in conduit 29 but other flow control means can be substituted therefor.

Drier 31, in the preferred modification, comprises a moving belt 33 supported on pulleys 34 and 36, at least one of these pulleys being powered. A heater 37 is also positioned within drier 31. Positioned below the downstream end of belt 33, drier 31 is provided with storage zone 38 and a valve controlled discharge line 39. Extending from the upper portion of drier 31, there is provided solvent removal conduit 41, conduit 41 passing through compressor 42 and condenser 43. Conduit 44, extending from condenser 43, communicates with conduit 23. Liquid removal conduit 46 extends from conduit 44 to a waste disposal system.

Chamber 19 is provided with liquid removal conduit 47. Communicating with conduit 47 is conduit 48, through which material passes to heater 49 and into separation means 51, which can be a simple flash chamber or other suitable means such as a fractional distillation column, an extraction apparatus, or the like, capable of separating the solvent from dissolved impurities. Removal conduit 52 extends from the lower end portion of separation means 51. Extending from the upper portion of separation means 51, I have provided conduit 53, this conduit connecting with condenser 54. Conduit 56 extends from condenser 54 and communicates with conduit 23 by means of conduit 44. Material passing through conduit 44 can be removed from the system through conduit 57.

Make-up solvent supply conduit 58 connects to conduit 23.

The operation of this apparatus is best understood when described in terms of a particular separation process. One suitable separation or purification which may be carried out using this apparatus is the purification of ammonium sulfate. This material in the dry state, decomposes at about 212° F. For this separation, water is conveniently used as the solvent. The first operation comprises cooling a solution of ammonium sulfate to the point at which crystallization takes place. This can be done in a scraped surface crystallizer, an Oslo crystallizer, or other suitable means. The resulting slurry is introduced into chamber 10 through conduit 17 and moved toward the other end of the column by means of piston 11. The operation of the piston causes a compact mass of crystals to be moved through the chamber 10. Water or an unsaturated aqueous solution of ammonium sulfate, is introduced into chamber 10 through conduit 14, this solution having been heated to approximately 200° F. by means of heater 27. Heater 13 supplies additional heat near the point of liquid removal in order to prevent plugging of liquid removal conduit 16. A saturated solution, still at 200° F., is removed through conduit 16 and cooled to approximately 125° F. by passing it through cooler 21. If 200 pounds per hour of saturated aqueous ammonium sulfate solution is withdrawn at 200° F. and then cooled to 125° F., approximately 15 pounds per hour of solid ammonium sulfate will be recovered in separation means 22. The aqueous solution removed through conduit 23 is saturated at the 125° F. temperature but, upon heating in heater 27 to the above mentioned 200° F. is no longer saturated and can be returned to chamber 10. The ammonium sulfate deposited in chamber 22 is passed through conduit 29 to drier 31 where it can be dried sufficiently for shipment. The water recovered therefrom passes through conduit 41, is condensed at 43, and then returned to the separation chamber 10.

A somewhat greater volume of solvent is introduced into the purification zone through conduit 14 than is removed through conduit 16. This excess is forced through the compact mass of crystals in chamber 10 by pressure displacement resulting from the movement of the compressed mass of crystals, and becomes saturated with respect to compound being purified, ammonium sulfate in the above discussion. This excess is generally in the range of from 1 to 20% of the total amount introduced through conduit 14. This excess passes through the crystal mass and removes impurities, this impure solution passing through screen 18 into chamber 19. This liquid passes through conduit 47 and is heated in heater 49. It then passes into flash chamber 51 where the solvent is flashed and the impurities are precipitated. The impurities can be removed through conduit 52. The solvent, after being condensed in condenser 54, passes through conduits 56, 44 and 23 back to chamber 10. Conduits 28, 46 and 57 are provided for the disposal of a portion of a solvent at various points in the process. Conduit 58 is provided through which fresh make-up solvent can be added.

When water is the solvent, materials which can be purified include the ammonium sulfate described above, sodium chloride, various sugars, etc. Ethyl alcohol can be used as a solvent for purifying halides of antimony and tin, such as ammonium bromide, tin bromide, etc.

The materials to which my invention is applicable are almost unlimited. One skilled in the art can easily determine the proper criteria for a given separation. With the impure material at hand, it is only necessary to find a solvent in which the pure material and any impurities are soluble. It is desirable to use a solvent which has a high rate of change of solubility with change of temperature. In ammonium sulfate, for instance, impurities are likely to include ammonium carbonate, ammonium thiocyanate, and salts of various metals, such as iron salts, zinc salts, and salts of arsenic.

The problem of decomposition on melting is also present with many organic materials, such as the large molecular organic materials, particularly medicinal chemicals, e. g., vitamin B2. Other representative organic compounds include alloxan, anthraquinone, biuret, creatine, gallic acid and guanine.

It will be apparent that many modifications can be made in my invention without departing from the scope thereof, the invention in its broadest aspect comprising passing the impure mass of crystals, or other solid material, countercurrent to a reflux which comprises a solvent for the solid material, withdrawing a saturated solution, cooling this saturated solution so that solid material will precipitate, separating the cooled solvent from the solid material, heating and reintroducing this solvent into the purification zone.

I claim:

1. A process for purifying an impure solid material, which comprises forcing an elongated compressed mass of impure solid material through an elongated confined displacement zone, introducing a solvent for said material into the downstream end of said elongated zone, dissolving solid material in said downstream end, removing a portion of the resulting solution, cooling said solution thereby causing at least a portion of the material being purified to precipitate therefrom, recovering said precipitated material as a product of the process, heating the solvent from which the solid material was recovered, returning said heated solvent to the downstream end of said displacement zone, forcing a further portion of the solution through said displacement zone and through and countercurrent to said compressed mass of solid material by pressure displacement resulting from the movement of said compressed mass of solid material, and removing the resulting liquid together with impurities from said displacement zone.

2. A process of purification by solid material formation comprising cooling a solution of material to form a slurry, passing said slurry from the cool toward the warm end of a purification zone having a cool end and a warm end countercurrent to a reflux stream obtained as hereinafter set forth, introducing a solvent for said solid material into the warm end of said purification zone, withdrawing a portion of said solvent having said solid material dissolved therein, cooling said withdrawn solvent sufficiently to cause pure solid material to precipitate therefrom, separating said solid material from said solvent, heating said solvent and returning it to the warm end of said purification zone, drying said solid material, recovering said dried solid material as a product of the process, condensing the solvent recovered during the drying of said solid material, heating and returning said solvent to the warm end of said purification zone, passing the balance of said solvent toward the cool end of said purification zone as said reflux stream, withdrawing said reflux stream having impurities dissolved therein from the cool end of said purification zone, heating said reflux stream sufficiently to cause said solvent to be evaporated therefrom, condensing said evaporated solvent, and heating and returning said condensed solvent to the warm end of said purification zone.

3. A process of purification by solid material formation comprising cooling a solution of material to form a slurry, passing said slurry from the cool toward the warm end of a purification zone having a cool end and a warm end countercurrent to a reflux stream obtained as hereinafter set forth, introducing a solvent for said solid material into the warm end of said purification zone, withdrawing a portion of said solvent having said solid material dissolved therein, cooling said withdrawn solvent sufficiently to cause pure solid material to precipitate therefrom, separating said solid material from said solvent, heating said solvent and returning it to the warm end of said purification zone, drying said solid material, recovering said dried solid material as a product of the process, condensing the solvent recovered during the drying of said solid material, heating and returning said solvent to the warm end of said purification zone, passing the balance of said solvent toward the cool end of the said purification zone as a reflux stream, and withdrawing said reflux stream having impurities dissolved therein from said purification zone.

4. The process of claim 1 wherein said solid material is ammonium sulfate.

5. Apparatus which comprises an elongated chamber, means to introduce solid material obtained from a solution by freezing into said chamber, means to move through said chamber a compressed mass of said solid material, a liquid removal conduit in the upstream end of said chamber, means to supply heated liquid to the downstream end of said chamber with respect to solid material movement comprising a heater and a conduit extending from said heater to said chamber, liquid-solid separation means located externally of said chamber, a liquid removal conduit communicating with said downstream end of said chamber extending to said liquid-solid separation means, a cooler in said liquid removal conduit, and a liquid removal conduit extending from said liquid-solid separation means to said heater.

6. Apparatus which comprises an elongated chamber, means to introduce solid material obtained from a solution by freezing into said chamber, means to move through said chamber a compressed mass of said solid material, means to supply heated liquid to the downstream end of said chamber with respect to solid material movement comprising a heater and a conduit extending from said heater to said chamber, liquid-solid separation means located externally of said chamber, a liquid removal conduit communicating with said downstream end of said chamber extending to said liquid-solid separation means, a cooler in said liquid removal conduit, a liquid removal conduit extending from said liquid-solid separation means to said heater, a dryer, a conduit extending from said liquid-solid separation means to said dryer, a solid material removal conduit extending from said dryer, and a liquid removal conduit in the upstream end of said elongated chamber.

7. Apparatus which comprises an elongated chamber, means to introduce solid material obtained from a solution by freezing into said chamber, means to move through said chamber a compressed mass of said solid material, means to supply heated liquid to the downstream end of said chamber with respect to solid material movement comprising a heater and a conduit extending from said heater to said chamber, liquid-solid separation means located externally of said chamber, a liquid removal conduit communicating with said downstream end of said chamber extending to said liquid-solid separation means, a cooler in said liquid removal conduit, a liquid removal conduit extending from said liquid-solid separation means to said heater, a dryer, a conduit extending from said liquid-solid separation means to said dryer, a solid material removal conduit extending from said dryer, a vapor removal conduit extending from said dryer to said means to supply a heated liquid to the downstream end of said chamber, a condenser in said last mentioned conduit, and a liquid removal conduit in the upstream end of said elongated chamber.

8. Apparatus which comprises an elongated chamber, means to introduce solid material obtained from a solution by freezing into said chamber, means to move through said chamber a compressed mass of said solid material, means to supply heated liquid to the downstream end of said chamber with respect to solid material movement, first liquid-solid separation means, a liquid removal conduit communicating with said downstream end of said chamber extending to said first liquid-solid separation means, a cooler in said liquid removal conduit, a liquid removal conduit extending from said first liquid-solid separation means to said means to supply the heated liquid to the downstream end of said chamber, a dryer, a conduit extending from said first liquid-solid separation means to said dryer, a solid material removal conduit extending from said dryer, a vapor removal conduit extending from said dryer to said means to supply a heated liquid to the downstream end of said chamber, a condenser in said last mentioned conduit, second liquid-solid separation means, liquid removal conduit extending from the upstream end of said elongated chamber to said second liquid-solid separation means, a heater in said last mentioned conduit, and a conduit extending from said second liquid-solid separation means to said means to supply a heated liquid to the downstream end of said elongated chamber.

References Cited in the file of this patent
UNITED STATES PATENTS

| | | |
|---|---|---|
| 2,091,900 | Widmer | Aug. 31, 1937 |
| 2,324,869 | Oman | July 20, 1943 |
| 2,617,274 | Schmidt | Nov. 11, 1952 |
| 2,672,487 | Tegge et al. | Mar. 16, 1954 |